(12) United States Patent
Noda

(10) Patent No.: US 6,264,299 B1
(45) Date of Patent: Jul. 24, 2001

(54) METHOD OF ERASING DOTS IN INKJET PRINTERS

(75) Inventor: Hideo Noda, Tokyo (JP)

(73) Assignee: Mutoh Industries Ltd., Tokyo (JP)

( * ) Notice: Subject to any disclaimer, the term of this patent is extended or adjusted under 35 U.S.C. 154(b) by 0 days.

(21) Appl. No.: 09/401,920

(22) Filed: Sep. 23, 1999

(30) Foreign Application Priority Data

Jan. 19, 1999 (JP) .................................................. 11-010368

(51) Int. Cl.⁷ .............................. B41J 29/38; B41J 2/205
(52) U.S. Cl. ................................... 347/15; 347/9; 347/12
(58) Field of Search .................................. 347/15, 9, 12, 347/13, 14; 346/140 R

(56) References Cited

U.S. PATENT DOCUMENTS

| | | | |
|---|---|---|---|
| 5,237,344 | * | 8/1993 | Tasaki et al. ...................... 346/140 R |
| 5,602,572 | * | 2/1997 | Rylander ................................. 347/15 |
| 5,677,714 | * | 10/1997 | Klassen et al. ......................... 347/15 |
| 5,742,300 | * | 4/1998 | Klassen ..................................... 347/9 |
| 5,818,474 | * | 10/1998 | Takahashi .............................. 347/15 |

* cited by examiner

Primary Examiner—John Barlow
Assistant Examiner—An H. Do
(74) Attorney, Agent, or Firm—Sughrue, Mion, Zinn, Macpeak & Seas, PLLC

(57) ABSTRACT

In case of an erasure of dots that reduce the ink density by thinning on dots of a bit map data, disappearance of thin lines, and a loss of low density picture and a gradation reversal are prevented. For this reason, mask patterns for thinning processing with different thinning rates according to densities of an original picture beforehand. A conjunction operation of the picture data of the original picture with the mask pattern according to the density of the picture data is carried out, and the on dots of the bit map data are thinned out to turn off thereby decreasing the ink density, and changing the thinning rate of the original picture. As the mask pattern, the thinning pattern is prepared against the original picture with 100% density, and the thinning rate is changed by changing the bit of 0 of the thinning pattern to 1 according to the density of the original picture. In case the density of the original picture is less than 50%, the thinning processing is not carried out.

6 Claims, 15 Drawing Sheets

(a) Original picture 100% density
(b) Thinning mask pattern
(c) 80% density as a result of thinning

FIG. 6

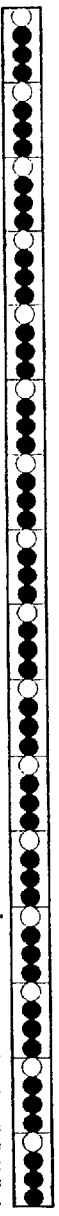

Fundamental mask pattern (for 100%, thinning rate 75%)

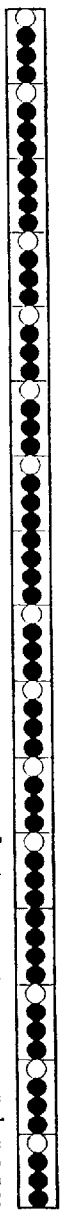

Mask pattern (thinning rate 80%) for original picture density 83%

Mask pattern whose original picture density is less than 50% (thinning rate 100%, without thinning)

○ A dot that discontinues discharge of ink by a thinning processing (conjunction)

● A dot that continues discharge of ink even though a thinning processing is applied

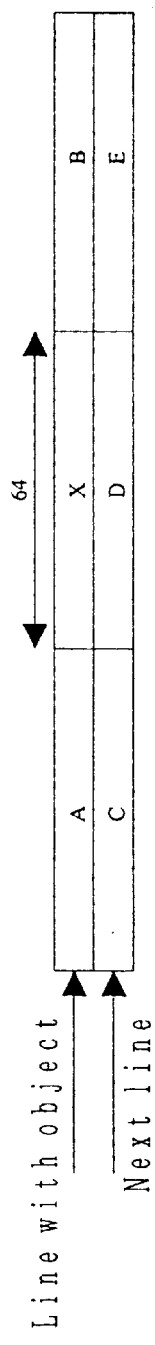
FIG. 9
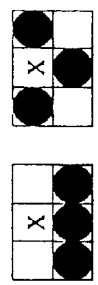
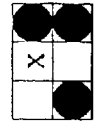 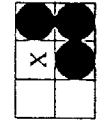
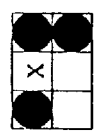 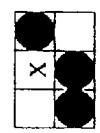
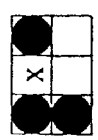 
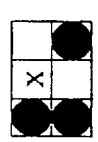 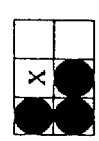
FIG. 10

FIG. 14
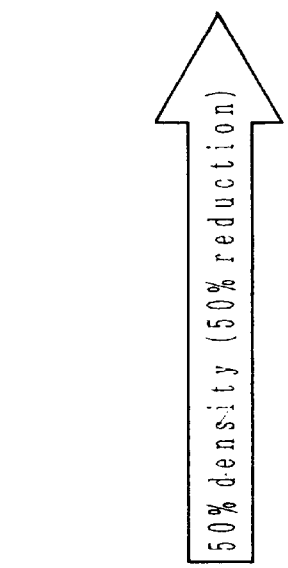
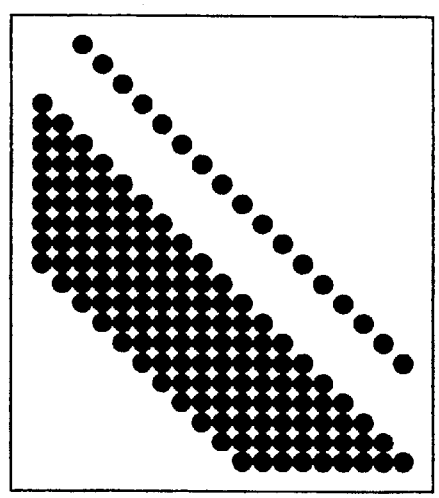
(a) Original picture.
Thick line and thin line
(b) 50% density.
Disappearance of thin line.
● Dot of discharged ink
○ Dot that is not discharged by thinning processing (a) Original picture. 100% and 25%

50% density (50% reduction)

(b) 50% density. Disappearance of low density original picture

● Dot of discharged ink

○ Dot that is not discharged by thinning processing

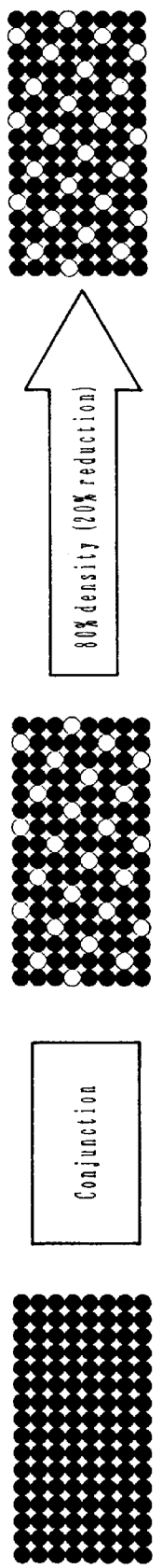

METHOD OF ERASING DOTS IN INKJET PRINTERS

SPECIFICATION

BACKGROUND OF THE INVENTION

The present invention relates to a method of erasing dots in inkjet printers (plotters). More particularly, it relates to a pixel array printing for a thinning processing of dots in a high density printing region.

In the inkjet printers (plotters), a plotting is applied by spraying ink dots in a variety of media. Depending on kinds of the media, the ink tends to stain or is almost not absorbed which permits overflow on the surface that spoils a quality of image or picture greatly. Although this problem might be solved by minimizing a quantity of discharged ink of the inkjet head, actually, inkjet heads having a high tenacity to materialize completely the ink discharge quantity that meets with each media have not been introduced into a market. Whereas a method of reducing an ink density by not permitting the discharge of dots that are produced from the discharge of the ink has been considered. For this method, some of bits of 1 (on) to the bit map data in the plotter controller may be converted to 0 (off). This processing is called the thinning processing, and it is materialized with a firmware in the plotter controller.

The thinning processing is a processing that converts some of bits of 1 of the bit map expanded in the plotter controller to 0 as described in the foregoing. For example, as shown in FIG. 6, in order to change an original picture with 100% density to a picture with 80% density, 20 pieces of dots per 1 dot (black in the drawing) of 100 pieces are replaced to 0 (white in the drawing). More concretely explained, a conjunction operation with the bit map pattern having 80% density is conducted. If the conversion of 0 with concentration in a small region is performed, a density irregularity appears that reduces a quality of picture so that the rewriting from 1 to 0 is performed by dispersing it over a wide range as much as possible. As explained in the foregoing, the case where an original picture with 100% density changes to the 80% density as a result of the thinning processing is called a thinning rate 80%.

In the foregoing thinning processing, the ink density might be lowered, but problems such as disappearance of thin lines, deterioration of shape, or disappearance of a picture with low density occur.

[Problems of disappearance of thin lines]

An extreme example of the disappearance of thin lines is shown in FIG. 14. There are thick lines and thin lines with 100% density in an original picture (a). With respect to this picture, when the density is lowered to 50%, there is a great apprehension that the thin lines like (b) disappears completely. Although the thick lines have not lost the shape, there is a possibility that the shape is deteriorated that lowers a quality of picture depending on a position or angle of a segment of a line.

[Problem of disappearance of original picture with low density]

For example, as shown in FIG. 15, in case a 50% thinning is applied to two pieces of a segment of a line with gray scales 100% and 25%, there is a possibility that an original picture with 25% gray scale disappears. In this case, the disapperance occurs as it is entirely dependent on a position of a segment of a line or a pattern of gray scale or the density is not lowered at all. The reason for a great influence of this phenomenon on the quality of picture is obvious in the case of the thinning processing that relatively and greatly lowers the density relative to the gray scale data of low density.

The cause of loosing the thin lines and low density picture data resides in a point that the dots are erased which are already a few in a region. In an extreme case, in case the thinning processing is applied to the data with 1 dot only, results are such that no change occurs or the dot is erased thereby producing a white paper. A preferable object of the thinning processing is a portion with a high dot density to a certain degree. For example, in case a thinning processing, namely, a conjunction operation with a thinning pattern is applied to reduce the density to 75%, if the thinning processing is applied to a point having higher than 75% density upon an examination of a neighborhood of dots of the original picture that becomes its object, the picture loss phenomenon can be restrained.

However, in this method, the picture with 75% density becomes the picture with 56% density that is 75% of 75%, and the picture with less than 74% remains as the original picture.

As a result, the reversal of the density occurs, which produces a possibility of losing the gradation of the original picture. As a special example of this method to show the fact, in the official gazzette of Japanese Patent Laid Open Publication No. Hei 7-236057, a method of thinning operation against the density portion of 100% is proposed, but the method only executes the reduction of the density of a full single color picture, and maintains the picture density as it is against the high density picture of about 90%, and fails to achieve the original object of the invention that reduces the ink discharge amount.

An object of the present invention is to prevent this gradation reversal phenomenon.

SUMMARY OF THE INVENTION

In case of performing the erasure of dots that reduces the ink density by thinning on dots of the bit map data, the erasure arranges to prevent the disappearance of thin lines, loss of the low density picture as well as the gradation reversal. For this purpose, a mask pattern for the thinning processing that has a variety of thinning rates according to densities of original picture is prepared. The conjunction operation with the mask pattern according to the picture data of the original picture and the densities of the picture data is carried out, and the ink densities are reduced by turning to off with the thinning of on dots of the bit map data, and the thinning rate of the original picture is changed according to the densities. The mask pattern changes the thinning rate by preparing the thinning pattern against the original picture with 100% density and changing the bit of 0 of the thinning pattern to 1 according to the densities of the original picture In case of the density of the original picture is lower than 50%, the thinning processing is not carried out.

DESCRIPTION OF THE DRAWINGS

FIG. 6 is a drawing showing an effective thinning pattern;

FIG. 9 is an explanation drawing of a correction pattern generating operation;

FIG. 10 is a drawing showing a 66.7% correction pattern of an original picture;

FIG. 14 is a drawing showing an example of disappearance of thin line;

FIG. 16 is a drawing showing a fundamental theory of thinning.

DETAILED DESCRIPTION OF THE INVENTION

Embodiments of the present invention will be described in details by referring to accompanied drawings.

Figure 2:
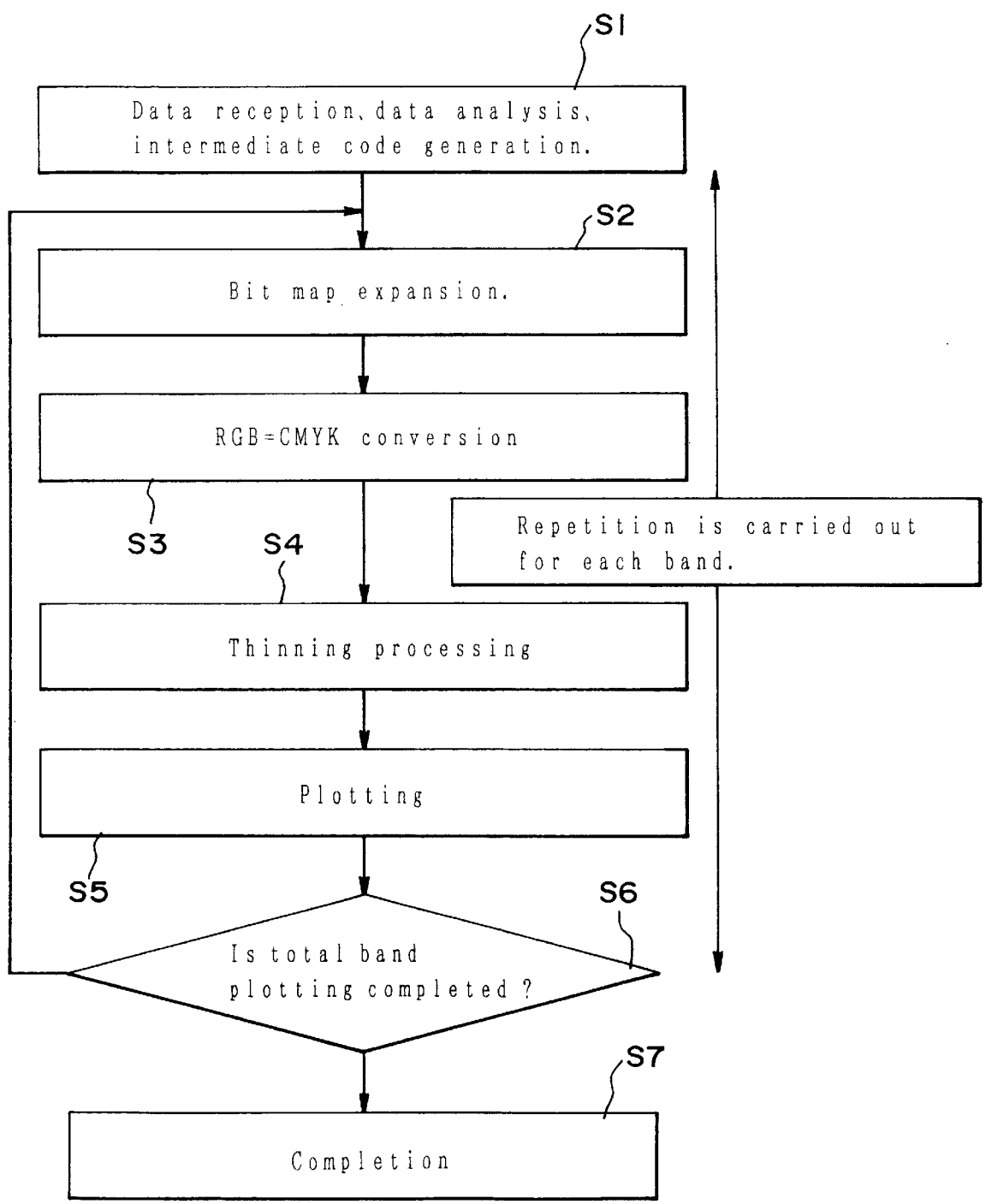
FIG. 2 is a flow chart showing a flow of data in the plotter.
Figure 3:
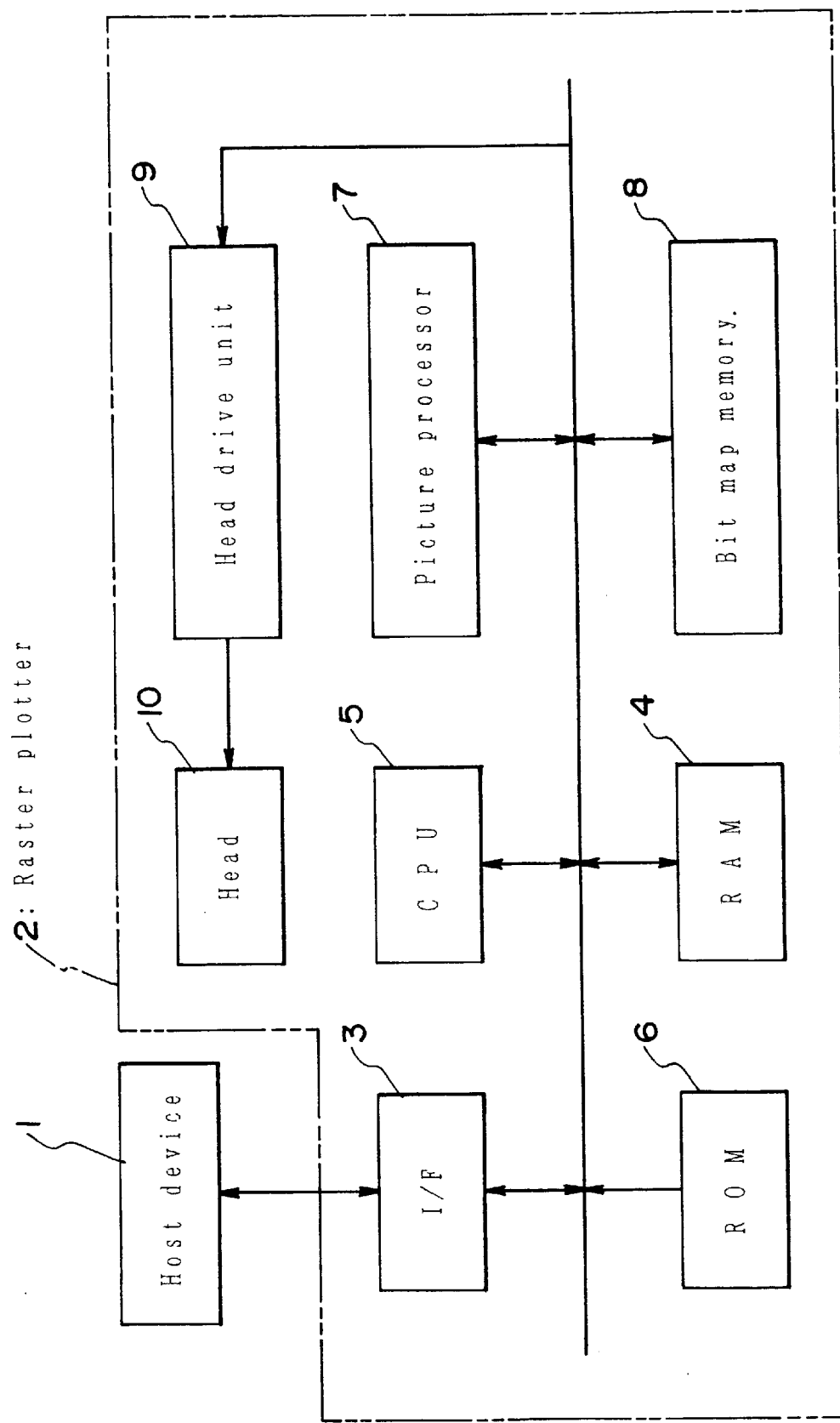
FIG. 3 is a block explanation drawing showing a construction of the plotter.

In the first place, the flow of the data in the inkjet printer (plotter) is to be described by referring to the flow chart of FIG. 2 and the system block diagram of FIG. 3.

The vector data transmitted from the host device 1 is received by a RAM 4 (data reception) by means of an interface (1/F) having an FIFO buffering function.

A CPU 5 of the inkjet printer (plotter) performs a pretreatment such as a segmentation processing of a band width and a block width which are preset against a vector data stored in the RAM 4 and a sorting processing and the like on the basis of a program memorized in a ROM 6 (data analysis), and arranges the vector data contained in each block of each band in a system (for example, vector data) of an intermediate code (step 1). The picture processor 7 performs a DDA processing sequentially to the picture data of the intermediate code system stored in the RAM 4, and expands a raster data into the bit map memory 8 (step 2). The raster data expanded in a bit map memory 8 is converted to a CMYK data from a ROG data (step 3). Next, the CPU 5 performs a thinning processing to be described hereinafter (step 4), and the raster data converted to the CMYK data is sequentially fed to a head 10 by means of a head drive unit 9 to perform a plotting (step 5). Thereafter, the CPU 5 determines whether or not the whole band plotting is completed (step 6), and if the plotting is not completed, returns to the step 2, and if it determines it to be affirmative, whereby the printing output operation is completed (step 7).

Figure 1:
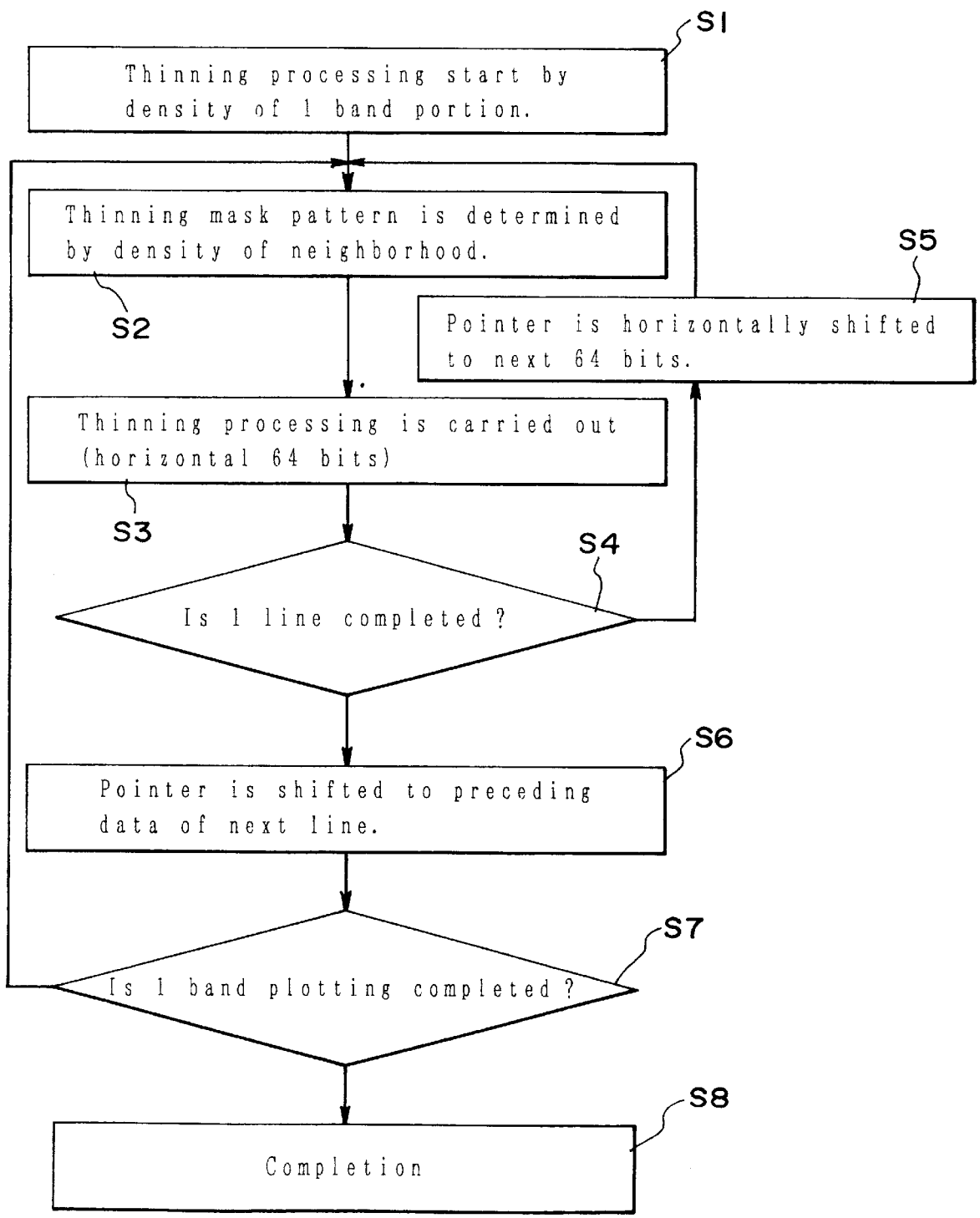
FIG. 1 is a flow chart showing a thinning processing sequence according to the present invention.

Whereas the detailed sequence of the thinning processing will be described by referring to FIG. 1.

The thinning processing in the inkjet printer performs the processing in a horizontal direction with 64 bits as one unit. Once the thinning processing for one band portion starts (step 1), the CPU 5 determines a thinning mask pattern (step 2). In the RAM 4 of the controller, a mask pattern for the thinning processing is previously stored and is ready according to each thinning rate.

Thereafter, the CPU 5 executes the thinning processing in a horizontal direction (step 3). And then, the CPU 5 determines if one line is completed or not (step 4) and determines it to be negative, performs a horizontal transfer of a pointer to the next 64 bits (step 5), and returns to the step 2. When it determines to be affirmative, transfers the pointer to the preceding data of the line (step 6). And then, the CPU 5 determines if 1 band plotting is completed or not, and determines to be negative, it returns to the step 2, and if it determines to be affirmative, the plotting is completed (step 8).

The mask pattern performs the conjunction operation with the picture data expanded in the bit map, and decreases the dots of 1 in the bit map and reduces the ink discharge dots. At this time, the mask pattern has a length of 64 bits so as to be capable of performing the thinning processing at a high speed with a repetition of the bit pattern of simple 0, 1. However, the repetition length of the pattern is not limited to 64 times and the repetition length is prepared as the mask pattern information.

Furthermore, in case the same pattern is applied to the next line as it is, a blank dot produces a blank perpendicular. In general, much of the vector to be outputted by a CAD data and the like are of perpendicular or horizontal direction so that in case the blank perpendicular is used in the thinning pattern, it becomes extremely conspicuous. Under the circumstance, after the thinning processing of 1 line segment in the horizontal direction is completed, the mask pattern is used by staggering in the next line. The amount of staggering of the pattern at this time is provided as the information of the pattern.

Figure 4:
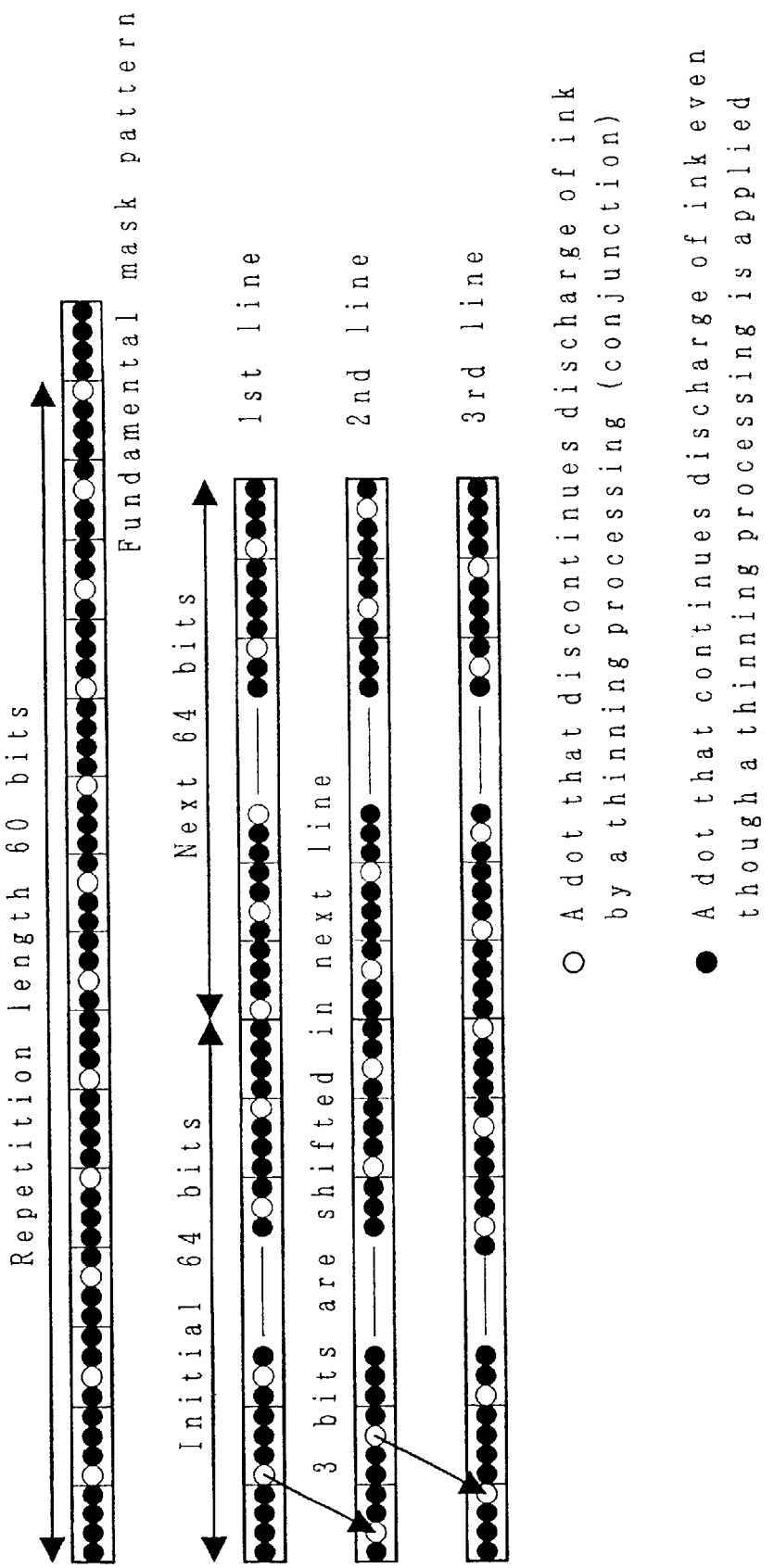
FIG. 4 is a drawing showing an applicable example of the thinning pattern.
Figure 5:
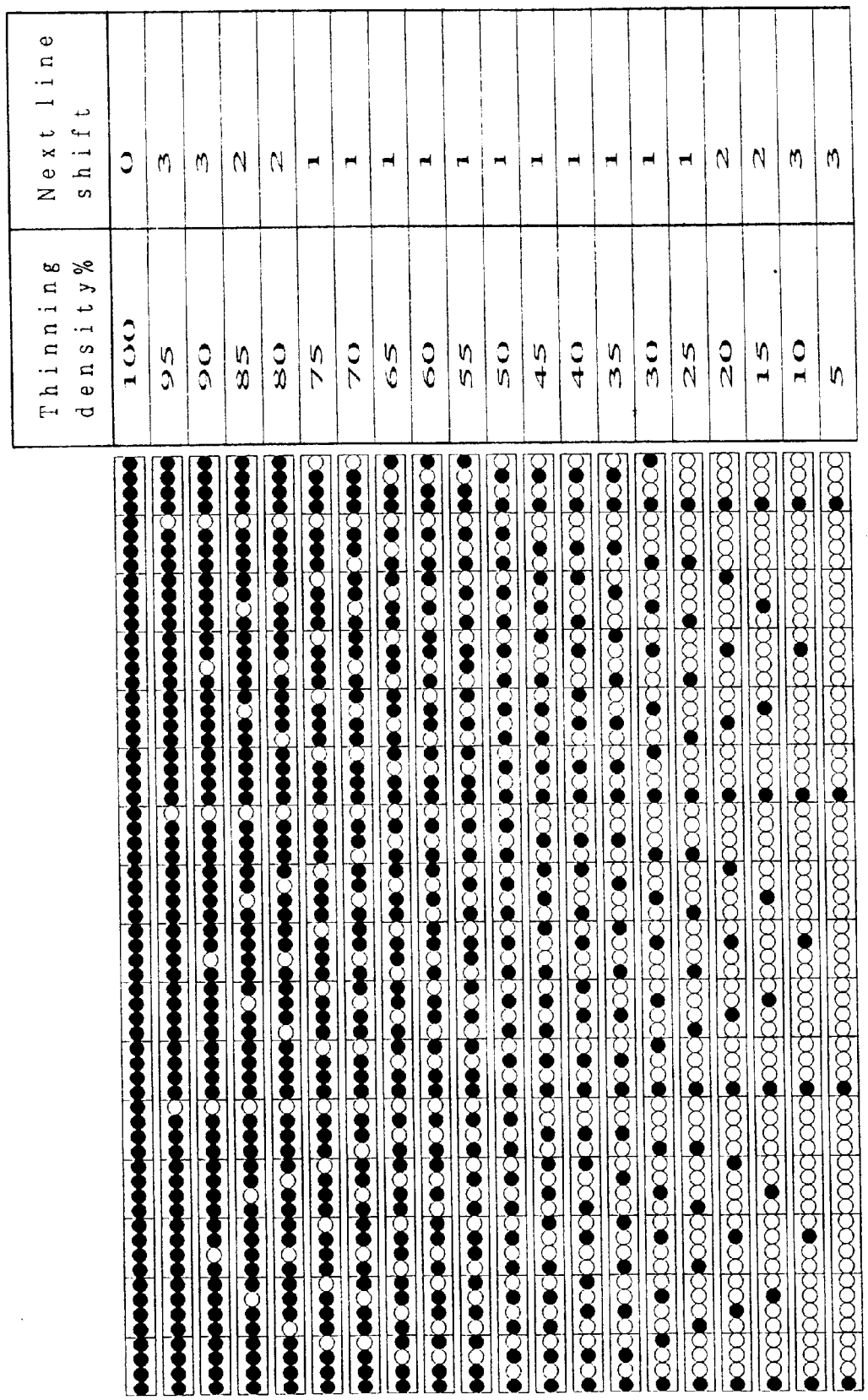
FIG. 5 is a drawing showing a thinning mask pattern.

An example of the thinning processing using the mask pattern is shown in FIG. 4. In the controller of the inkjet controller, as shown in FIG. 51 the thinning pattern with 5% indent is prepared. When the thinning processing is carried out by finding a conjunction of the bit map with the above-noted thinning pattern, there is a danger of losing the thin lines or the low density original image. In order to prevent this danger, in this embodiment, the thinning pattern against the original picture with 100% density is prepared, and the thinning rate is changed by changing the 0 bit of the thinning pattern to 1 according to the density of the original picture.

In the following, the conditions are explained as an example.

(1) The thinning rate against the original picture 100% is 75%.

(2) In case of the original picture being less than 50%, the thinning processing is not carried out. (thinning rate 100%)

(3) In case of the density between the original picture 100% to 50%, the thinning rate 75% to 100% is applied. In the conditions, for example, as shown in FIG. 6, the mask patterns for thinning against 83%, 50% are generated by changing the fundamental mask pattern to be used in the original picture 100%.

The mask pattern for the original picture density 83% is found as the thinning rate of about 80%, but this rate is different from the thinning pattern for the original thinning rate 80%. It is the pattern to be obtained by changing the bit of 0 of the fundamental mask pattern. The algorithm that changes the thinning pattern according to the density of the original picture has been described, but actually, the thinning pattern is changed according to the density of the neighborhood against each dot of the original picture. The thinning rate is changed by changing the dot of the thinning pattern corresponding to the dot to 1 against a certain dot.

Figure 7:
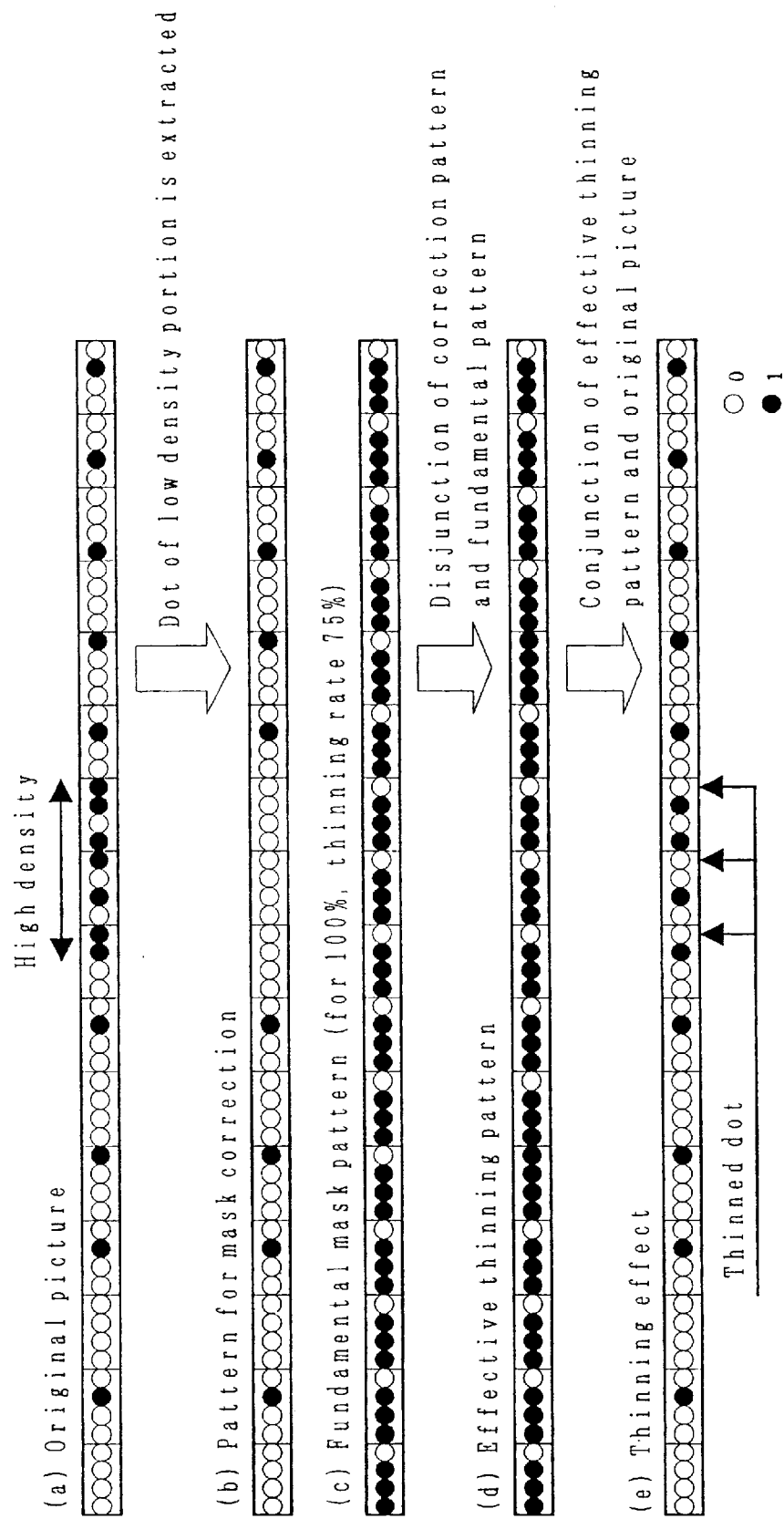
FIG. 7 is a drawing showing an effective thinning pattern against a low density picture.

FIG. 7 shows a region of certain 64 bits in 1 line. The original picture has the high density in the vicinity of the center, and the low density in the peripheral portion of the right and left. In the vicinity of the center, the thinning processing is carried out, and in the vicinity of the periphery, the processing of keeping the original picture to remain is preferable. The CPU extracts (b) the pattern for correction of the mask that removes the dot of the high density portion of the original picture. This correction pattern generates (d) the effective thinning pattern by the disjunction operation with the fundamental thinning pattern. The thinning rate tan be improved by reducing the bits of 0 in the thinning pattern by the disjunction operation whereby the loss of the thin lines or the low density portion can be prevented.

In order to generate the effective thinning pattern according to the original picture density from the fundamental thinning pattern to be applied to the original picture 100%, the necessity of the correction pattern is explained. This correction pattern is related to the density of the neighborhood point of the original picture. The portion of the original picture whose density is less than 50% is not thinned out by the conditions set forth in the foregoing (1), (2) and (3). In order to satisfy the conditions, the examination may be made about whether or not the density in the neighborhood that becomes the object exceeds 50% or not, namely, the neighborhood dots are sampled to find out if more than a half is on or not.

Figure 8:
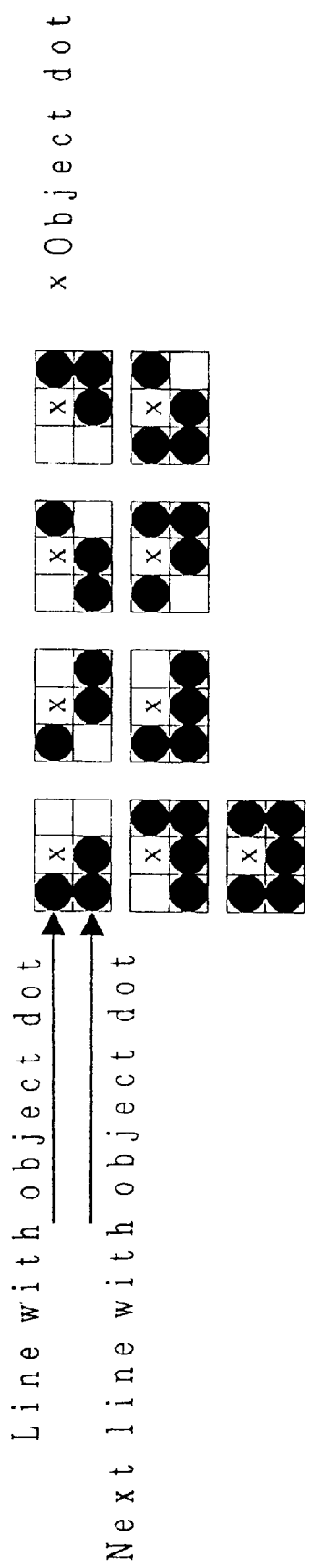
FIG. 8 is a drawing showing a correction pattern generating method.

However, in this method, the gradation reversal occurs. Under the circumstance, in this embodiment, as shown in FIG. 8, the thinning rate is changed by finding the correction pattern with the logic operation using the peripheral 5 dot. In this method, the correction pattern S (thinning pattern) of the dot that becomes the object of the thinning is determined by the following numerical formula.

$$S=\overline{(((A \cup B) \cap \overline{(C \cup E)}) \cap D)}$$

In FIG. 8 and the foregoing formula, X denotes a dot that is an object of inspection, and AB denotes a dot adjacent to the object, and CDE denotes a dot in the next line of the object.

This operation becomes a high speed in this embodiment as it is carried out with 64 bit unit as shown in FIG. 9.
In FIG. 9, X denotes a 64 bit word that becomes the thinning operation object AB denotes a 64 bit word of right and left of the object word CED denotes a word of the next line of the object word and its right and left The 64 bit word X that becomes the thinning operation object is represented by the following.

$$X=((A<<63) \cup (X)1) \cup (B>>63) \cup (X<<1)) ((C<<63)$$

$$\cup (D)>>1) \cup (E>>63) \cup (D<<1) D$$

In the foregoing formula,

<<n denotes left n bit shift

>>n denotes right n bit shift

The thinning rate of the effective thinning pattern generated by this method. In case of the original picture density 100%, all the dots are 1 (on), so that the correction pattern becomes 0, and the effective pattern determined by the disjunction with the fundamental pattern is the fundamental pattern itself. As a result, the 100% original picture is subjected to the thinning processing with the fundamental thinning pattern. In case where the original picture density is less than 50%, the dot of 1 of 6 dots including the object dots are less than 3 pieces. In case the object dot is 1, the dots that become 1 among the remaining 5 dots are less than 2 pieces so that the correction pattern as shown in FIG. 8 becomes 1. In case the object dot is 0, the correction pattern becomes 0 and in some case, 0 appears in the effective thinning pattern. However, in this case, since the object dot is 0, the manipulation is carried out not to change the original picture, and the reduction of the density does not occur. As a result, no manipulation is carried out against the original picture of less than 50%.

Let us think about the case that the original picture is above 50%. For example, in case the 4 dots among the 6 dots are 1 (on), the original picture density is 66.7%. In case the object dot is on, the 3 dots in the peripheral dots become on. The combination in which the 3 dots in the 5 dots are on consists of 10 selections, but as shown in FIG. 10, the correction pattern is generated so that the case of the 4 selections becomes the object of the thinning processing. Namely, in case of the original picture 66.7% density, the dot of 60% are preserved without relationship to the fundamental thinning rate, and the remaining 40% is subjected to the thinning processing with the fundamental thinning rate.

In case the thinning processing of the 66.7% original picture is carried out unconditionally with the fundamental thinning rate R, the final density becomes 0.667R, but the effective thinning density by the thinning correction pattern becomes 0.667 (0.6+0.4R). For example, in case the 70% thinning is carried out unconditionally against the density of the original picture 66.7%, the final density becomes 46.7% and the gradation reversal is generated with the portion of the original picture density 50%, but the thinning density becomes 88% with the effective thinning by the thinning correction, and the final density becomes 58.7%. The effective thinning rate on each density feasible by the dot group as shown in FIG. 8 which is formed by the object dot and the peripheral 5 dots is shown in Table 1, and the final density is shown in Table 2.

TABLE 1

| original picture density (%) | Effective Thinning Rate |||||||||||
|---|---|---|---|---|---|---|---|---|---|---|---|
| | | fundamental thinning rate (%) ||||||||||
| | R | 100 | 95 | 90 | 85 | 80 | 75 | 70 | 65 | 60 | 55 | 50 |
| 100.0 (6/6) | R | 100 | 95 | 90 | 85 | 80 | 75 | 70 | 65 | 60 | 55 | 50 |
| 83.3 (5/6) | 0.2 + 0.8R | 100 | 96 | 92 | 88 | 84 | 80 | 76 | 72 | 68 | 64 | 60 |
| 66.7 (4/6) | 0.6 + 0.4R | 100 | 98 | 96 | 94 | 92 | 90 | 88 | 86 | 84 | 82 | 80 |
| 50.0 (3/6) | 1.0 | 100 | 100 | 100 | 100 | 100 | 100 | 100 | 100 | 100 | 100 | 100 |
| 33.3 (2/6) | 1.0 | 100 | 100 | 100 | 100 | 100 | 100 | 100 | 100 | 100 | 100 | 100 |
| 16.7 (1/6) | 1.0 | 100 | 100 | 100 | 100 | 100 | 100 | 100 | 100 | 100 | 100 | 100 |

TABLE 1-continued

Effective Thinning Rate

| original picture density (%) | | fundamental thinning rate (%) | | | | | | | | | |
|---|---|---|---|---|---|---|---|---|---|---|---|
| | R | 100 | 95 | 90 | 85 | 80 | 75 | 70 | 65 | 60 | 55 | 50 |
| 0.0 (0/6) | 1.0 | 100 | 100 | 100 | 100 | 100 | 100 | 100 | 100 | 100 | 100 | 100 |

TABLE 2

Final Density

| original picture density (%) | fundamental thinning rate (%) | | | | | | | | | |
|---|---|---|---|---|---|---|---|---|---|---|
| | 100 | 95 | 90 | 85 | 80 | 75 | 70 | 65 | 60 | 55 | 50 |
| 100.0 (6/6) | 100 | 95.0 | 90.0 | 85.0 | 80.0 | 75.0 | 70.0 | 65.0 | 60.0 | 55.0 | 50.0 |
| 83.3 (5/6) | 83.3 | 80.0 | 75.0 | 73.3 | 70.0 | 66.6 | 63.3 | 60.0 | 56.6 | 53.3 | 50.0 |
| 66.7 (4/6) | 66.7 | 65.4 | 64.0 | 62.7 | 61.4 | 60.0 | 58.7 | 57.4 | 56.0 | 54.7 | 53.4 |
| 50.0 (3/6) | 50.0 | 50.0 | 50.0 | 50.0 | 50.0 | 50.0 | 50.0 | 50.0 | 50.0 | 50.0 | 50.0 |
| 33.3 (2/6) | 33.3 | 33.3 | 33.3 | 33.3 | 33.3 | 33.3 | 33.3 | 33.3 | 33.3 | 33.3 | 33.3 |
| 16.7 (1/6) | 16.7 | 16.7 | 16.7 | 16.7 | 16.7 | 16.7 | 16.7 | 16.7 | 16.7 | 16.7 | 16.7 |
| 0.0 (0/6) | 0.0 | 0.0 | 0.0 | 0.0 | 0.0 | 0.0 | 0.0 | 0.0 | 0.0 | 0.0 | 0.0 |

At the original picture density being less than 50%, the thinning is not carried out and the condition of the original picture is maintained. In case the fundamental thinning rate is relatively low, 55% and 50% against the original picture density 66.7%, while the final picture density reverses slightly with the gradation of the original picture, it indicates that the thinning processing can be carried out by maintaining the light and shade relationship of the original picture generally. In case, for example, the original picture density is 70% which is outside those values, the dot group as shown in FIG. 8 is picked out from the original picture 70%, such densities like 66.7% density (4 dots on) or 83.3% density (5 dots on) are produced.

The relationship is produced with the rate 66.7%, and the probability of the density is X, 0.7=0.667X+0.833(1−X)

X=0.4

This relationship explains that the effective thinning rate of the original picture density 66.7% and 83.3% is subjected to an alignment interpolation. For example, in case, the fundamental thinning rate 80% is applied to this original picture, the effective thinning rate r becomes as follows provided that the original picture density is 83.3% and 66.7% are available from the Table 1.

r=0.92×0.4+0.84×0.6 r=0.872

Therefore, the final density x becomes x=rX=0.872×0.7=0.61 and after all, the picture of the original picture density is deteriorated to 61% as far as the density is concerned.

Assuming that the thinning processing is carried out at a certain density X with the effective fundamental thinning rate r and the final density is Y, and the effective thinning rates $r_H$, $r_L$ of the original picture $x_H$ having the higher density than X and the original picture $x_L$ having the lower density than X available from the Table 1 are determined from the following formulae.

$$r_H = (1-P_h) + P_H R$$

$$r_L = (1-P_L) + P_L R$$

Whereas, $P_H$ is the density probability of $X_H$, and $P_L$ is the density probability of $X_L$.

The effective thinning rate r is as follows.

$$r = \frac{(X-X_L)r_H + (X_H - X)r_L}{X_H - X_L}$$
$$= \frac{(r_H - r_L)X + X_H r_L - X_L r_H}{X_H - X_L}$$

and the final density Y becomes as follows.

$$Y = rX$$
$$= \frac{(r_H - r_L)X^2 + (X_H r_L - X_L r_H)X}{X_H - X_L}$$

This formula is a quadratic equation that describes a parabola and has a numerical value. This shows a possibility that the gradation reversal may occur as a result of the thinning processing. A coefficient ($r_H - r_L$) means that the effective thinning rate against the low density original picture is subtracted from the effective thinning rate against the high density original picture. In this embodiment, this value always becomes negative as shown in FIG. 1, and the parabola becomes a convex shape. In case the original picture density X is smaller than an apex of the parabola, the gradation reversal never occur. An X coordinate of the apex, namely, the point at which the gradation reversal occurs is the point at which the formula produced by differentiating Y with X becomes 0, and is available from the following formula.

$$\frac{dY}{dX} = \frac{2(r_H - r_L)X + (X_H r_L - X_L r_H)}{X_H - X_L} = 0$$

-continued $$X = \frac{X_H r_L - X_L r_H}{2(r_L - r_H)}$$

Figure 11:
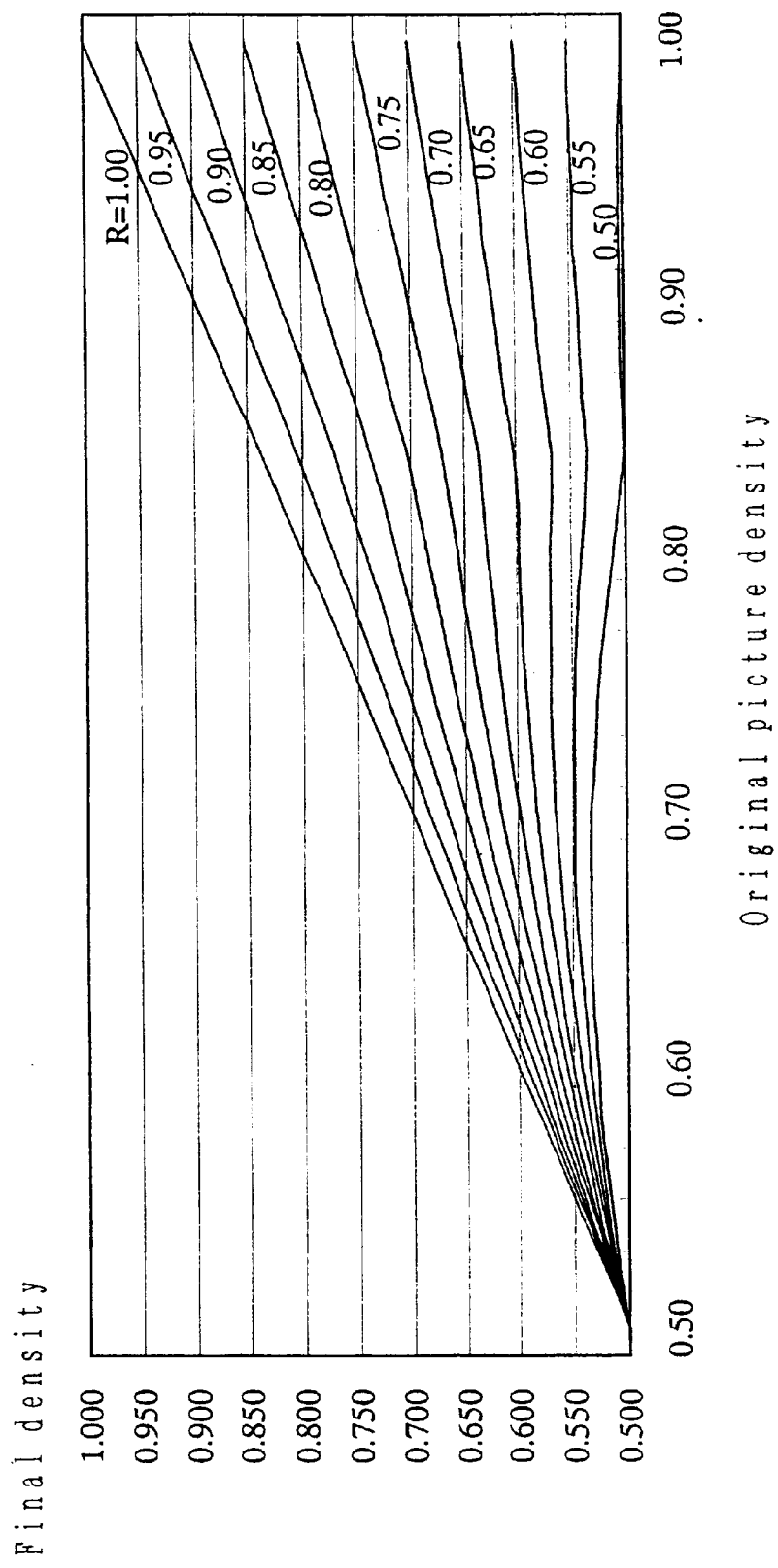
FIG. 11 is a graph showing a final density characteristics.

The conditions where the gradation reversal occurs from the point available as set above between each $X_H$ and $X_L$ is the case where the fundamental thinning rate is 50%, 55%, 60% respectively. When the final density characteristics against each thinning rate is actually plotted, the result is shown in FIG. 11. As described in the foregoing, in case of the large thinning rate such as 50% to 60%, the final density is predetermined to 50–60% in the portion of more than 50% of the original picture that becomes the thinning object, and the gradation reversal is not conspicuous since almost no contrast is visible.

Figure 12:
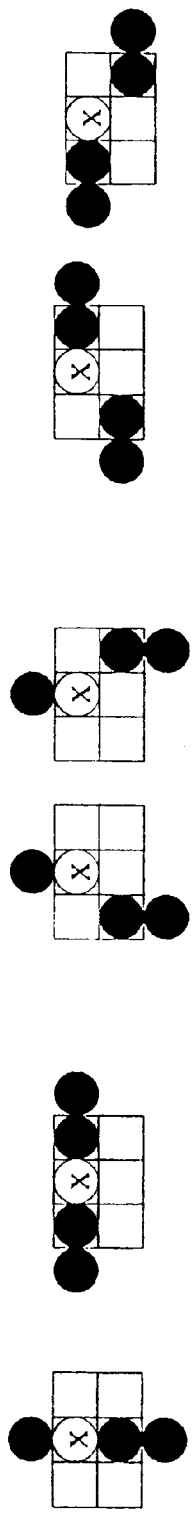
FIG. 12 is a drawing showing a correction pattern region passing of thin line of 1 dot width.

As it has been described, in the thinning processing of the present embodiment, the thinning against the low density original picture is not carried out, and the thinning processing against the high density picture aims at the low density while suppressing the gradation reversal against the original picture. The thin line data is basically the low density data so that this method can be applied but there is a strong directional property of horizontal or perpendicular without the density being relatively uniformly distributed like the image picture or the thick lines with gradation. 1 dot width segment line of perpendicular, horizontal, oblique passes the correction pattern, either one appears as shown in FIG. 12.

Figure 13:
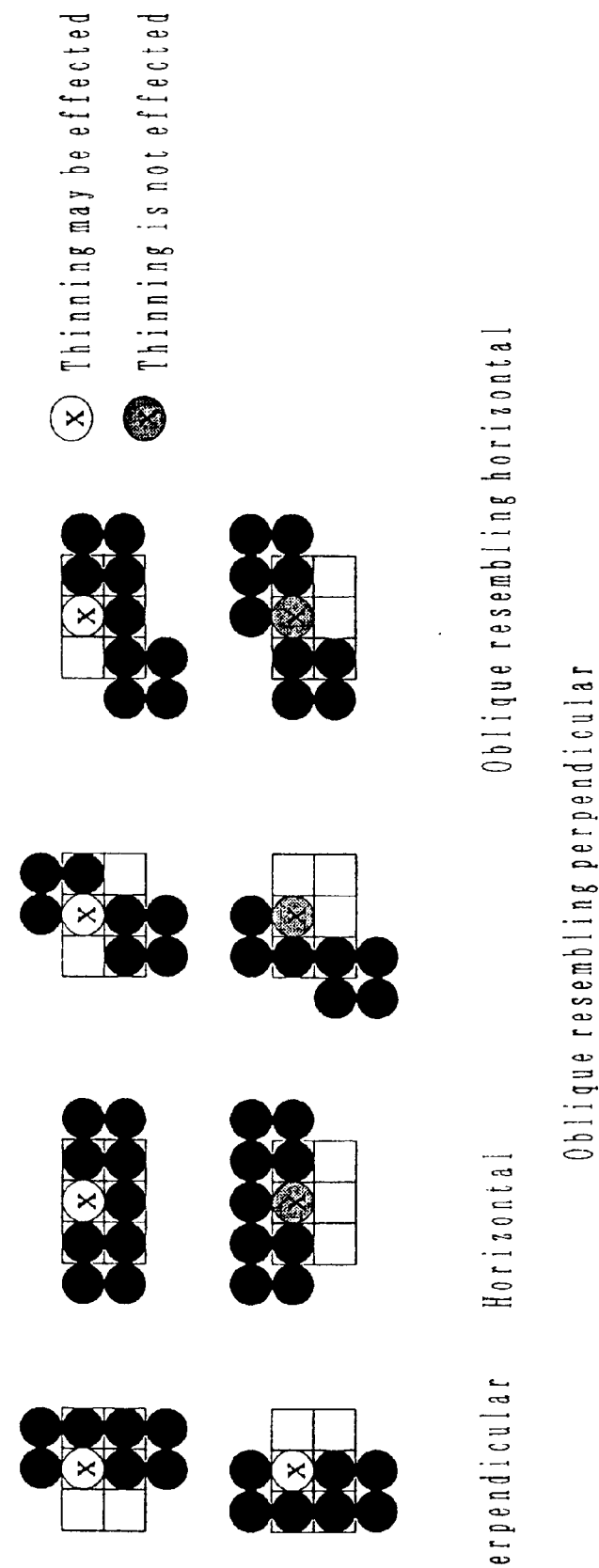
FIG. 13 is a drawing showing a correction pattern region passing of thin line of 2 dot width.
Figure 15:
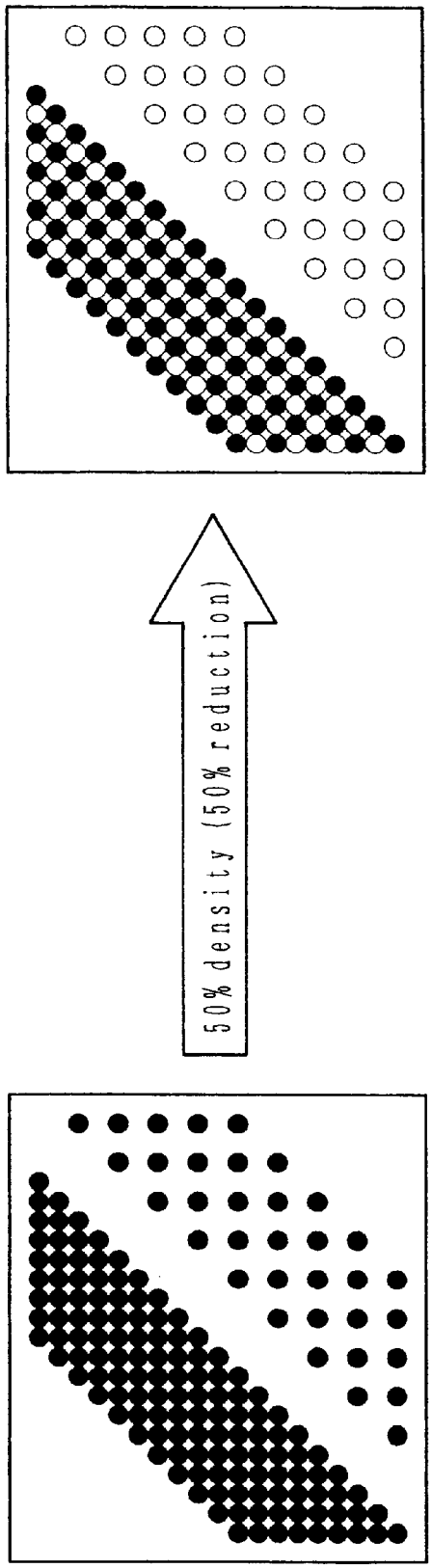
FIG. 15 is a drawing showing a loss of low density original picture.

In this case, all the thinning correction masks become 1 and the thinning is not carried out and the segment line keeps the original shape. In case of slightly thicker 2 dot line, as shown in FIG. 13, there are cases where the thinning is not carried out and the object of the thinning is carried out which becomes the object of the thinning, but the thinning processing is suppressed to a certain degree. Furthermore, the thick segment line of more than 3 dot width is partly not subjected to the thinning processing, but basically, it becomes the same processing with the 100% density. Of course, if the segment line has the gradation, a matched effective thinning rate may be selected.

The construction of the present invention has been described in the foregoing, and in case of reducing the ink discharge amount of the inkjet printer, it is feasible to suppress the loss of the thin lines and the low density portion of the picture, and the generation of the gradation reversal is suppressed, and the quality of the plotting can be improved with appropriate amount of the ink.

What is claimed is:

1. A method of erasing dots in an inkjet printer wherein on dots of a bit map data are thinned out to turn off, thereby reducing an ink density, said method comprising:

preparing mask patterns for thinning processing with different thinning rates according to density of an original picture, performing a conjunction operation with the mask patterns according to the picture data of the original picture and the densities of the picture data, and changing the thinning rates of the original picture according to the densities of the picture data.

2. A method of erasing dots in an inkjet printer according to the claim 1 wherein as the mask pattern, the thinning a pattern against the original picture with 100% density is prepared, and the thinning rate is changed by changing the bits of 0 of the thinning pattern to 1 according to the densities of the of the original picture.

3. A method of erasing dots in an inkjet printer according to the claim 2 wherein the correction pattern for mask correction which eliminates dots of high density portion of the original picture is extracted, and the effective thinning pattern is generated by a conjunction operation of of the correction pattern and the basic thinning pattern.

4. A method of erasing dots in an inkjet printer according to claim 2 wherein the thinning processing is not carried out in case the density of the original picture is less than 50%.

5. A method of erasing dots in an inkjet printer according to claim 1 wherein the thinning processing is not carried out in case the density of the original picture is less than 50%.

6. A method of erasing dots in an inkjet printer according to the claim 1 wherein the mask pattern is produced by a repetition of bit pattern of simple 0, 1, and the mask pattern is used in the next line after completion of the thinning processing of 1 line segment in the horizontal direction against the original picture by staggering a predetermined amount.

* * * * *